United States Patent
Zlotnick

Patent Number: 5,408,540
Date of Patent: Apr. 18, 1995

[54] CHARACTER SLANT RECOGNITION IN A WORD IMAGE

[75] Inventor: Aviad Zlotnick, Lower Galil, Israel

[73] Assignee: International Business Machines Corporation, Armonk, N.Y.

[21] Appl. No.: 102,187

[22] Filed: Aug. 5, 1993

[30] Foreign Application Priority Data

Dec. 10, 1992 [GB] United Kingdom ............... 9225832

[51] Int. Cl.⁶ .............................................. G06K 9/32
[52] U.S. Cl. .......................................... 382/46; 382/61
[58] Field of Search .................. 382/46, 47, 24, 25, 382/9, 18, 61; 340/731; 345/126, 124

[56] References Cited
U.S. PATENT DOCUMENTS

| | | | |
|---|---|---|---|
| 3,831,146 | 8/1974 | Rundle | 382/46 |
| 4,712,185 | 12/1987 | Aoki | 382/46 |
| 4,723,297 | 2/1988 | Postl | 382/46 |
| 4,759,076 | 7/1988 | Tanaka et al. | 382/46 |
| 4,764,975 | 8/1988 | Inoue | 382/47 |
| 4,866,784 | 9/1989 | Barski | 283/9 |
| 4,953,230 | 8/1990 | Kurose | 382/46 |
| 4,956,722 | 9/1990 | Hamada | 382/47 |
| 5,050,225 | 9/1991 | Itoh | 382/46 |
| 5,131,053 | 7/1992 | Bernzott et al. | 382/9 |
| 5,181,260 | 1/1993 | Kurosu et al. | 382/46 |

*Primary Examiner*—Joseph Mancuso
*Attorney, Agent, or Firm*—Joseph C. Redmond, Jr.; John D. Flynn

[57] ABSTRACT

An Image processing apparatus and method for character slant detection and correction is disclosed. The apparatus comprises: scanning logic for scanning a word image and applying a local slant test to each pixel to determine whether in the image at the pixel there is local character slant to the left, to the right or neither and storing a local slant flag accordingly. Also disclosed is logic for combining the local slant flags for the pixels in each row and applying a significance test to the result to obtain, for the row, a row-slant flag indicative of whether in the row there is greater number of pixels having a local character slant to the right, a greater number of pixels in the row having a character slant to the left or neither. The logic for combining the row-slant flags for all of the rows to determine a shear parameter and logic for applying a shear transformation to the image in accordance with the shear parameter is also disclosed.

11 Claims, 4 Drawing Sheets

FIG. 2A
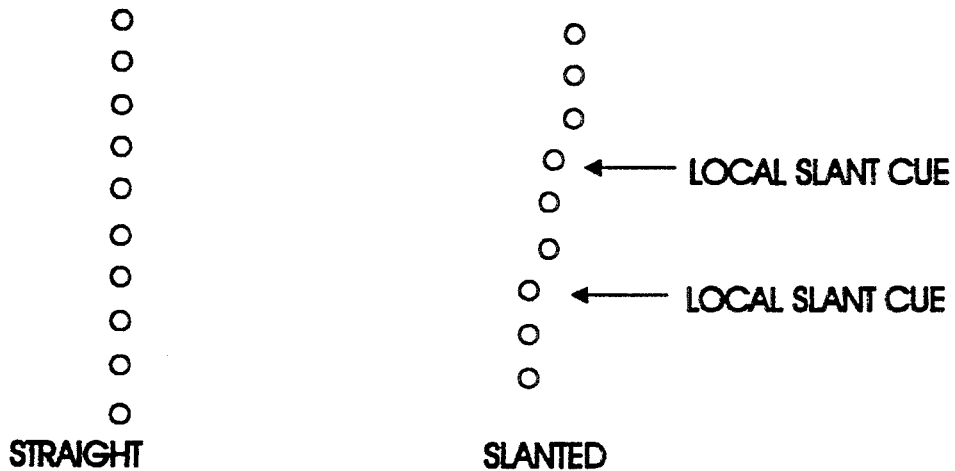
STRAIGHT    SLANTED
FIG. 2B
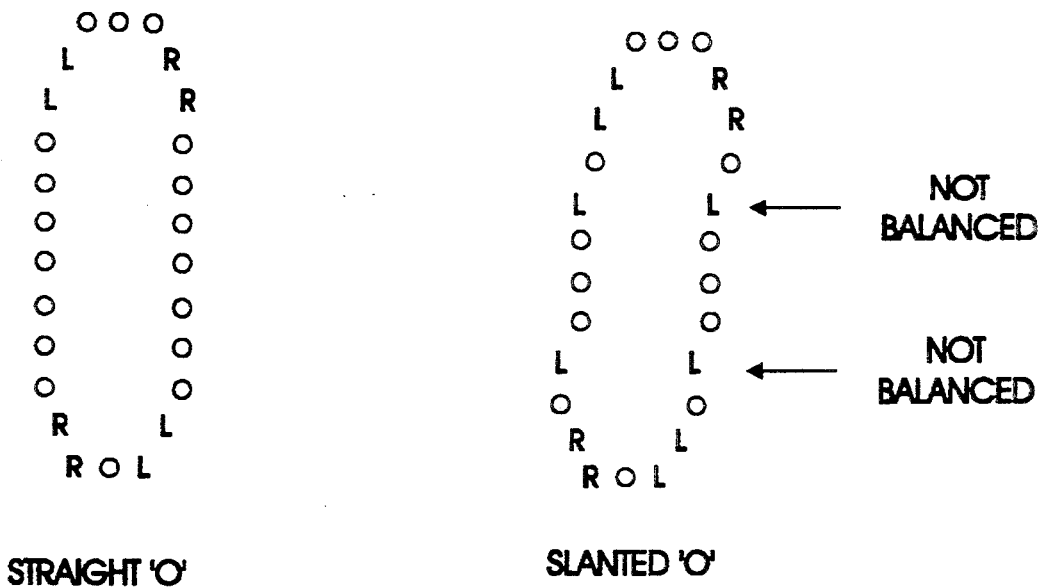
STRAIGHT 'O'    SLANTED 'O'
FIG. 3A    FIG. 3B
```
* 0 1   * 0 1        1 0 *   1 0 *
0 1 *   0 1 *        * 1 0   * 1 0
0 1 *   1 * *        * 1 0   * * 0
```

FIG. 5A  \ \ \ \ \  | | | | |  | | | | |

MOMENT BASED SLANT: 0.24, LOCAL CUE BASED SLANT 0.25

FIG. 5B  | | |  ≡≡≡  | | |

MOMENT BASED SLANT: 3.53, LOCAL CUE BASED SLANT 0.00

FIG. 5C  LAUSANNE  LAUSANNE  LAUSANNE

MOMENT BASED SLANT: 0.97, LOCAL CUE BASED SLANT 0.00

FIG. 5D  *LAUSANNE*  LAUSANNE  LAUSANNE

MOMENT BASED SLANT: 1.42, LOCAL CUE BASED SLANT 0.33

FIG. 5E  LAUSANNE  LAUSANNE  LAUSANNE

MOMENT BASED SLANT: -0.75, LOCAL CUE BASED SLANT 0.92

FIG. 5F  PULLY  PULLY  PULLY

MOMENT BASED SLANT: 1.30, LOCAL CUE BASED SLANT 0.00

FIG. 5G  MORGES  MORGES  MORGES

MOMENT BASED SLANT: 0.40, LOCAL CUE BASED SLANT 0.31

CHARACTER SLANT RECOGNITION IN A WORD IMAGE

FIELD OF THE INVENTION

This invention relates to image processing apparatus and methods for the compensation of the slant of the characters in an image of a word.

BACKGROUND OF THE INVENTION

In the field of Optical Character Recognition (OCR), many matching features are sensitive to the slant of the characters. For instance, if a system expects an "I" to be a vertical line, then it may very well fail to recognize an "I" that has a 45 Degree slant. Furthermore character slant varies between different fonts, the handwriting of different people, and even different instances of handwriting of the same person, creating significant problems in learning character templates, and matching new input to existing templates. Character slant becomes an even bigger problem when dealing with whole words in which individual characters are to be separated automatically. The slant may cause vertical overlap between consecutive characters, thus making separation much more error prone.

There is a known method, proposed by R. G. Casey in an article titled "Moment Normalization of Handprinted Characters" published on IBM Journal of Research and Development, September 1970, for correcting the character distortions. This method uses global correlation between X and Y values of pixels for detecting the character slant. The method is based on transforming the input image so that the XY moment around the image's centroid is 0. The method reportedly works well for single characters, but when dealing with complete words, and not single characters, it frequently fails. A word may be skewed without relation to the slant: a person can write perfectly straight characters, but each one a bit higher (or lower) than the previous one. In such cases the global skew severely distorts the slant computed for individual characters, thus making global correlation methods unsuitable for processing more than a single character at a time, and in particular for separating characters in handwritten words. In addition to this problem, some single characters, such as L, have non-zero correlation between X and Y values, and a false slant is detected by global correlation methods. In processing whole words this problem is severely magnified.

SUMMARY OF THE INVENTION

The present invention is directed to a method and apparatus that satisfies these needs. It is an object of the present invention to overcome the above drawbacks of the prior art. It is an object of the invention to provide for the detection of slant in a group of characters or word. It is an object of the invention to correct slant detected in a group of characters or word.

Accordingly, the present invention provides image processing apparatus for correcting the character slant in a word image in electronic form, which image comprises a plurality of pixels arranged in rows and columns, each having a corresponding image value, the apparatus comprising: slant value storage for storing a local slant flag for pixels of the word image, a row slant flag for rows of the image and a shear parameter; scanning logic for scanning the electronic form of the image and applying a local slant test to the image values of each image pixel and the neighboring pixels thereto to determine whether in the image at the pixel there is local character slant to the left, to the right or neither and storing a local slant flag in the slant value storage accordingly; logic for reading from the slant value storage, combining the local slant flags for the pixels in each row and applying a significance test to the result of the combination to generate, and store in the slant value storage, a row-slant flag for the row, which row-slant flag is indicative of whether in the row there is significantly greater number of pixels with local slant indicators showing a local character slant to the right, a significantly greater number of pixels in the row with local slant indicators showing a character slant to the left or neither; logic for reading from the slant value storage and combining the row-slant flags for all of the rows to determine the shear parameter; logic for applying a shear transformation to the electronic form of the image in accordance with the determined shear parameter.

In one embodiment, the logic for applying the shear transformation comprises: logic for determining a monotonic sequence of integers between 0 and the shear parameter, the length of said sequence being equal to the number of rows in said image, and said integers of the sequence being univocally associated to a row; logic for shifting, for each row, each pixel image value a number of positions equal to the integer of said sequence associated with the row.

The logic for combining the local slant flags to generate the row slant flag can comprise, for example, logic for determining, along the row, the difference between the number of local slant flags indicating local character slant to the left and the number of local slant flags indicating local character slant to the right.

Preferably, the apparatus comprises logic for normalizing the result of the combination of the local slant flags, prior to application of the significance test, by dividing said result by the number of pixel color changes in the row.

In a preferred form of the invention the local slant test comprises a comparison of an n×n pixel neighborhood centered on the pixel with a plurality of predetermined pixel patterns, at least one of which patterns comprises features characteristic of character slant to the left and at least one of which patterns comprises features characteristic of character slant to the right.

In one, particularly efficient form of the invention the generation of the local slant flags, the combination of the local slant flags and the generation and combination of the row slant flags take place in the same scan of the image.

The invention also provides an Optical Character Recognition (OCR) system for recognizing an image of a word, the OCR system comprising the above-described image processing apparatus and a scanner connected with the image processing apparatus, the scanner providing the image processing apparatus with the word image in electronic form.

Furthermore, the present invention provides a method of operating image processing apparatus to correct the character slant in a word image in electronic form, which image comprises a plurality of pixels arranged in rows and columns, each having a corresponding image value, the method comprising the steps of: scanning the electronic form of the image and applying a local slant test to the image values of the pixel and the neighboring pixels thereto to determine whether in the image at the pixel there is local character slant to the left, to the right or neither and storing a local slant flag accordingly; reading from storage and combining the local slant flags for the pixels in each row, and storing the result of the combination; applying a significance test to the result of the combination to generate, and store, a row-slant flag for the row, which row-slant flag is indicative of whether in the row there is significantly greater number of pixels with local slant flags showing a local character slant to the right, a significantly greater number of pixels in the row with local slant flag showing a character slant to the left or neither; reading from storage and combining the row-slant flags for all of the rows to determine a shear parameter; applying a shear transformation to the electronic form of the image in accordance with the determined shear parameter.

BRIEF DESCRIPTION OF THE DRAWING

These and other objects, features, aspects, and advantages of the present invention will become better understood with regard to the following description, appended claims and accompanying drawings where:

FIGS. 2a–b are a comparison between straight and slanted characters.

FIGS. 3a–b are a schematic diagram of the masks on which the slant operators apply.

FIGS. 5A–G are a comparison between the results obtained with the prior art method and with the method of the present invention.

DETAILED DESCRIPTION OF THE INVENTION

The foregoing and other objects, features, and advantages of the invention will be apparent from the following more particular description of the preferred embodiment of the invention, as illustrated in the accompanying drawings. In the preferred embodiment the method is applied in an Optical Character Recognition system.

Figure 1:
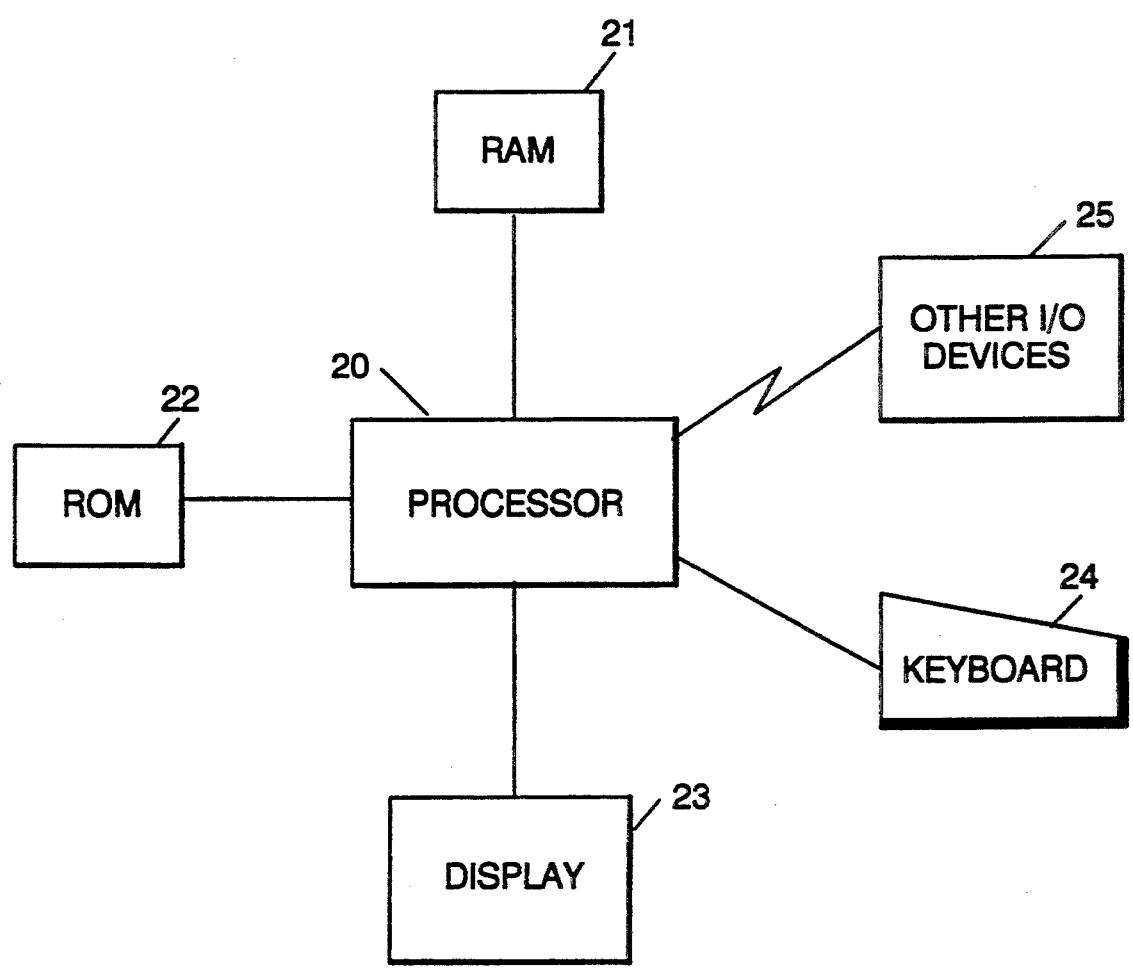
FIG. 1 is a schematic diagram of the system embodying the invention.

In FIG. 1 the data processing system which embodies the invention is illustrated. It includes a processor 20, a RAM memory 21, a ROM memory 22, a display monitor 23 and a keyboard 24. The system is provided with digitally stored image of the word to be analyzed, by devices communicating with the system through additional I/O connections 25. Such a device could be an external memory or a scanner. A scanner is a device for transforming a document image into an electronic representation which can be subsequently processed by the data processing system. The operation of such a device is well understood and will not be described further herein.

The slant value storage is provided, in this embodiment, by RAM 21. The scanning logic and the various other logical elements referred to in the claims are provided, in this embodiment, by processor 20 under the control of a suitable control program. It will be understood, however, that the invention could be implemented in special purpose hardware or, indeed, by any combination of hardware and software.

The processor 20 may be a microprocessor such as is found in the IBM PS/2 personal computer model 80, as well as several models of IBM RISC System/6000 machines (IBM, PS/2 and RISC System/6000 are trademarks of International Business Machines Corporation).

Referring to FIGS. 2A and 2B the estimation of the slant of characters in a word is described. In FIG. 2A on the left there is a vertical line. This line has no slant, and there is no difference in the horizontal position of its top and its bottom. On the right there is a slanted line. There is a displacement of two pixels between its top and its bottom. This total displacement is actually accumulated in two steps, which are marked as local slant cues. In practice characters are not composed of straight lines alone, and it is difficult to delineate vertical segments even in characters that have them. However, local slant cues still can be found, and the slant can be estimated using these cues. FIG. 2B illustrates this. The example shows the local slant cues in a straight "O" and in a slanted one. L's mark pixels that are shifted left with respect to their neighbor in the row above, and R's mark those that are shifted to the right. The point of interest is that in the straight figure the left and right cues on one raster row cancel each other, whereas in the slanted figure there are two rows in which right cues do not cancel left cues. This balance between right cues and left cues is computed for each row on the whole word length. The rows with a different numbers of local slant cues to the right and local slant cues to the left are called unbalanced, and it is these rows that are used to compute the slant in whole words. The number of unbalanced rows will determine the magnitude of the global word slant.

Three types of slant cues are defined: L, R, and Z. An L type cue indicates a left shift of the bottom with respect to the top. An R type cue indicates a right shift of the bottom with respect to the top. A Z type cue indicates a crossing from the background into a character when scanning along a row from left to right. Slant cues are found using local slant test operators which test pixel neighborhoods to determine whether there is a slant cue at an image point and assign a local slant flag value or cue accordingly. One way to implement the local slant cue operators is as follows:

$L(x,y)$ is 1 for the pixel configurations shown in FIG. 3A, 0 otherwise: (The center pixel is $(x,y)$, 1 stands for inside a character, 0 outside, and * for don't care).

$R(x,y)$ is 1 for the pixel configurations shown in FIG. 3B, 0 otherwise: (The center pixel is $(x,y)$, 1 stands for inside a character, 0 outside, and * for don't care).

$Z(x,y)$ is 1 if pixel $(x,y)$ is in a character and $(x-1, y)$ is not. Otherwise $Z(x,y)$ is 0.

In a bi-level, black on white image, a pixel is considered inside a character if it is black, and outside if it is white. It should be noted that with these operators the maximum detectable slant is 45 Degrees.

Figure 4:
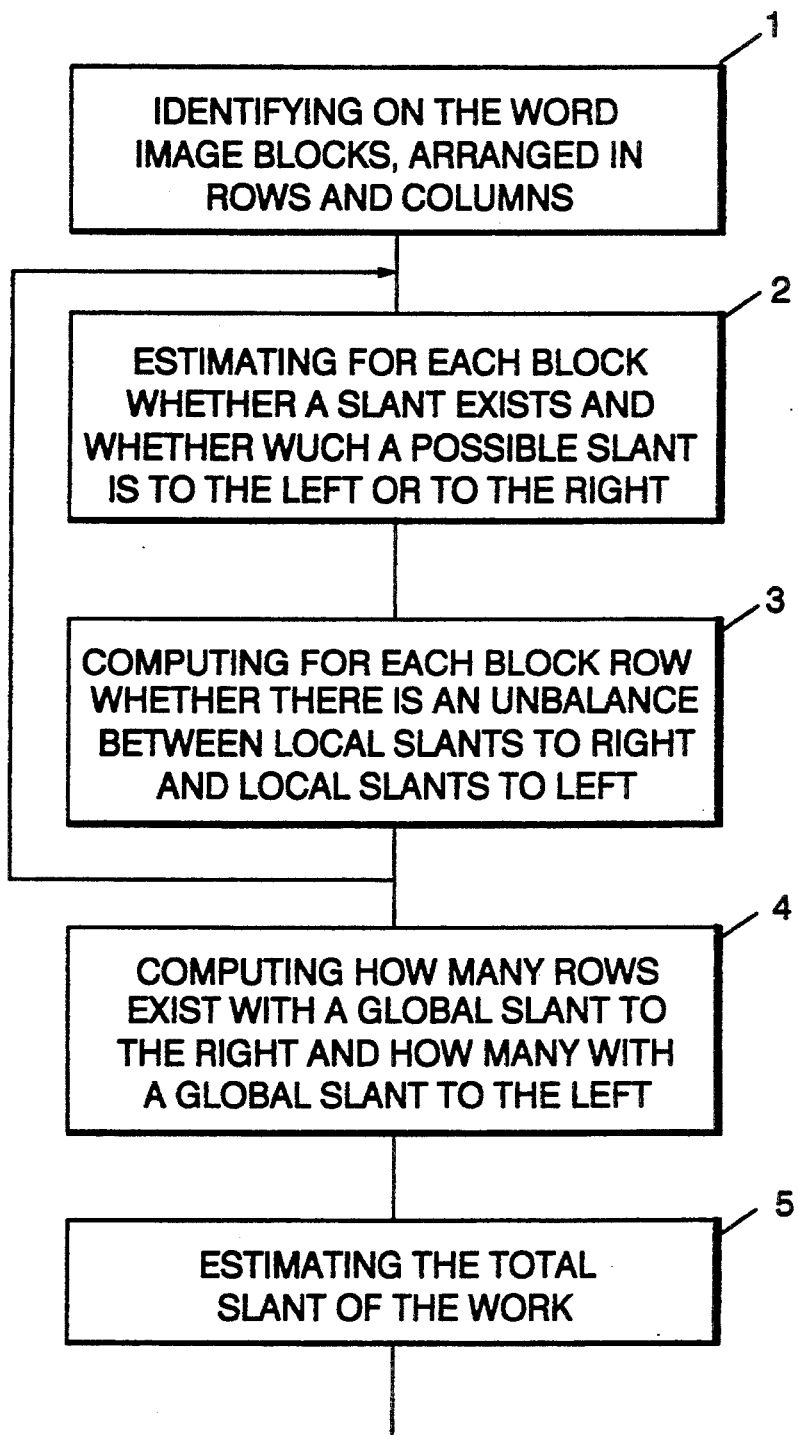
FIG. 4 is a schematic diagram of the process of determining the slant of the word.

FIG. 4 represents the process of determining the slant of the whole word. Step 41 corresponds to the definition of the image blocks on which the local slant will be computed. In the preferred embodiment, for each pixel, the operators $L(x,y)$ and $R(x,y)$ are applied considering a 3×3 pixel area around the pixel to be tested. Step 42 is the determination of the local slant flag through the use of the operators $L(x,y)$ and $R(x,y)$. It will be understood that the local slant flags, the results of applying operators L and R, can either be explicitly stored as a variable defined in the program (e.g., as bit-maps for the whole image) or implicitly stored (e.g., when a conditional branch in the program depends on the result of applying the local slant tests).

With the step 43 the whole image row is checked (combining the local slants computed in the previous step) to see if it is balanced. If it is not, the shift direction and significance of the imbalance are calculated. A row in which the imbalance is not significant is assigned a row slant flag of 0, and a row in which the imbalance is significant is assigned a row slant flag of +1 or −1 according to the imbalance direction. Step 42 and step 43 are repeated for every pixel row.

As mentioned above, rows in which left and right local cues are not balanced are used to compute the slant.

The row slant flags of all the image rows are combined to produce the slant estimate. A simple way to combine these flags is to sum them up. Specifically, the process is as follows:

The system reads the image file from disk. In this embodiment, images are stored in IOCA (Image Object Content Architecture) format and compressed according to a compression schemes which can be RASTER, G3 or G4. The cited format and compression schemes will be well understood by those skilled in the art.

With the aid of standard decompression functions, the image data are translated into a list of black pixels, where each pixel is represented by its X (columns) and Y (rows) coordinates.

The image is scanned and for each row y in the image, S(y) and N(y) are computed, where $$S(y) = \sum_{x=1}^{n} \{L(x,y) - R(x,y)\} \text{ and}$$

$$N(y) = \sum_{x=1}^{n} Z(x,y)$$

where n is the number of pixels in an image row. S(y) indicating the degree of imbalance in row y of the image. A positive value indicates a left shift, and a negative value indicates a right shift. N(y) indicates the number of character components in the row. In an image with a significant character slant S(y) is expected to be significant with respect to N(y). Normalization with respect to N(y) is achieved by dividing S(y) by the square root of N(y). The normalized score $$\frac{|S(y)|}{\sqrt{N(y)}}$$

is proportional to the number of standard deviations from the expected S(y) where the slant cue operators return random values. The word global slant G is computed by applying a significance test to the normalized score and summing, as follows $$G = \sum_{1}^{n_{rows}} \{SIGN(S(y))\} \left( \frac{|S(y)|}{\sqrt{N(y)}} > t \right)$$

where $n_{rows}$ is the number of rows of the image, SIGN(S(y)) is the row's shift direction, and t is a threshold that determines the sensitivity of the procedure. A value of t=2 is suitable for the needs of the present invention. An alternative method for combining the row slant flags is to find the median of the distances between the significantly unbalanced image rows, and give its inverse as the slant magnitude.

In practice the above steps are implemented in the following way.

(i) Each pixel in the list that has a white neighbor to its left is tested to determine whether it is a right cue, by comparison of its neighborhood with the patterns of FIG. 3A.

(ii) Each pixel in the list that has a white neighbor to its right is tested to determine whether it is a left cue, by comparison of its neighborhood with the patterns of FIG. 3B.

(iii) For each row two numbers S and Z are calculated. S is the difference between the number of pixels in the row that are left cues and the number of pixels in the row that are right cues, where positive S means there were more right cues and negative S means there were more left cues. Z is the number of color changes in the row.

(iv) For each row, a row slant flag I is calculated in the following way:

if S is greater than or equal to 0 and S*S is greater than t*Z then I=1;

if S is less than or equal to 0 and S*S is greater than t*Z then I=−1;

else I=0.

(v) For each row, the calculated I is added to a shear parameter G that accumulates the sum of slant indicators in the image.

In the embodiment, the slant of the characters is corrected by counter-shearing the image according to the computed slant. A monotonic sequence of numbers between 0 and G is needed. The length of such a sequence has to be equal to the number of rows in the image. A Digital Differential Analyzer (DDA) algorithm is used to obtain the sequence. The DDA algorithm, shown below implemented in a C language function, insures that there is uniform spacing of the places in which neighboring elements of the sequence are not equal. This function returns n equidistant samples from i0 to i1 (including i0 and i1). If called with s=NULL the function allocates storage for the output, otherwise it uses the provided storage. In the described embodiment, this function is executed, giving the parameter i0 the value 0, to the parameter i1 the value G and to the parameter n the value $n_{rows}$ corresponding to the number of the rows in the image.

```
int *DDA(int i0, int i1, int n, int *s)
{
    int res, m, dm, dn, i, delta;
    if (s = = NULL)
        s = (int *) malloc(n*sizeof(int));
    m = i1 − i0;
    dm = 2*(n−1);
    dn = 2*ABS(m);
    delta = (m>0) − (m<0);
    for (res = 1 = 0; i<1; ++i)
    {
        while (res >= n)
        {
            res −= dm;
            i0 += delta;
        {
            *s++ = i0;
            res += dn;
        }
    return (s−n);
}
```

For each row, for each black pixel in that row, stored in RAM 21, the X coordinate (column element) of the pixel in the list of black pixels stored in RAM 21 is updated by outputting storage signals to the RAM 21 adding the value of the above sequence that corresponds to the row number writing the corrected value in the RAM 21. The list of black pixels is translated back to a standard image format and output to a file stored on an external disk drive (not shown in FIG. 1).

It will be understood that it is not necessary to actually store the corrected version of the image since once the above sequence has been determined it can be stored and a shear transformation applied to the uncorrected image as and when required during subsequent processing.

In FIG. 5 an example is shown which represents the comparison between the correction of a slanted word obtained with Casey's method and the correction obtained with the method of the present invention. In each one of the seven images of FIG. 5, the left hand image is the original input, the middle image is computed by Casey's method (i.e., shearing so that the XY moment is zero), and the right hand image is computed by the method of the present invention.

The first example A shows a synthetic case of slightly slanted lines, all at the same height. Both methods detect the slant correctly.

The second example B shows three vertical lines, all of the same length, but written in increasing heights. The moment based method does eliminate the XY correlation, but totally distorts the image. The new method leaves the image intact.

Still with synthetic examples, the third illustration C shows the effect of accumulation of characters that do not have a zero moment. Again, the moment based method falls, while the new method leaves the image intact.

The fourth image D was derived from the third by horizontal shearing. The first two rows were shifted two pixels to the right, the next two were shifted 1 pixel to the right, and the last two rows were not changed. The moment based method still fails, whereas the new method correctly computes a 33% shear. The corrected image is a bit distorted due to sampling error, which caused the second row to be one pixel off.

The next three examples E, F, G show slant correction for real images of handwritten words. In the first of these examples we see the same phenomenon as in the third and forth synthetic examples. The second illustrates a case in which the new method decides not to do anything while the old method distorts the image. In the last example we show a case in which the old method is comparable to the new one.

From these examples one may see that the moment based approach frequently results in slants whose magnitude is unrelated to the actual character slant, and sometimes even in a slant in the wrong direction. On the other hand, the new method almost always improves the image, and does not suggest a slant when there is no significant slant in the image.

In a more complete testing environment, the effect of introducing slant correction into a word recognition program was tested. The program accepts a list of names, and then reads images of hand printed words, and tries to match the input images to words in the given list. For every input image, up to two ranked suggestions are output. An experiment has been performed in which the word recognition program was given a list of 4775 words, and 100 input images of hand printed words from the given list. The words were written by 100 different people that were not aware that a machine will attempt to read their writing. Without slant correction the first suggested word was correct in 87 cases, with correction—in 96.

The present invention has been described using a cartesian image representation for describing the slant detection method, but it will be understood it could equally well be practiced in other applications, such as using images represented by run ends, saving both processing time and storage requirements. Any slant cue operators that examine a local area around a pixel and identify the slant and the slant potential can be substituted for the ones described above. In fact, good results are achieved using 2 by 2 masks, but preferred the 3 by 3 masks because they are less sensitive to noise.

The slant sensitivity threshold t can be adjusted to suit the particular OCR technique used, and in addition to that it may be beneficial to ignore slants whose magnitude is less than an image size dependent threshold.

While the present invention has been described with reference to structures disclosed herein, it is not confined to the details set forth and this disclosure is intended to cover such modifications or changes as may come within the purposes of the improvements or the scope of the following claims.

What is claimed is:

1. An image processing apparatus for correcting the character slant in a word image in electronic form, which image comprises a plurality of pixels arranged in rows and columns, each having a corresponding image value, the apparatus comprising:

a slant value storage for storing a local slant flag for pixels of the word image, a row slant flag (I) for rows of the image and a shear parameter (G);

scanning logic, coupled to said slant value storage, for scanning the electronic form of the image and applying a local slant test to the image values of each image pixel and the neighboring pixels thereto, the local slant test detecting color change patterns in the neighborhood of the pixel to determine whether in the image at the pixel there is local character slant to the left, to the right or neither and said scanning logic storing a local slant flag in the slant value storage accordingly;

logic coupled to said slant value storage, for reading from the slant value storage, combining the local slant flags for the pixels in each row and applying a significance test to the result (S) of the combination to generate, and store in the slant value storage, a row-slant flag (I) for the row, which row-slant flag is indicative of whether in the row there is significantly greater number of pixels with local slant indicators showing a local character slant to the right, a significantly greater number of pixels in the row with local slant indicators showing a character slant to the left or neither;

said logic for reading from the slant value storage and combining the row-slant flags (I) for all of the rows to determine the shear parameter (G); and said logic applying a shear transformation to the electronic form of the image in accordance with the determined shear parameter (G).

2. An image processing apparatus as claimed in claim 1 wherein the logic for applying the shear transformation comprises:

second logic for determining a monotonic sequence of integers between 0 and the shear parameter and insuring there is uniform spacing where neighboring elements of the sequence are not equally spaced, the length of said sequence being equal to the number of rows in said image, and said integers of the sequence being univocally associated to a row;

second logic for shifting, for each row, each pixel image value a number of positions equal to the integer of said sequence associated with the row.

3. An image processing apparatus of claim 2 wherein the local slant flag comprises two binary variables, a first of which variables takes a first binary value if there is local slant to the right and a second binary value otherwise; and a second of which variables takes the first binary value if there is local slant to the left and the second binary value otherwise.

4. An image processing apparatus of claim 2 wherein the logic for combining the local slant flags to generate the row slant flag comprises logic for determining, along the row, the difference between the number of local slant flags indicating local character slant to the left and the number of local slant flags indicating local character slant to the right.

5. An image processing apparatus of claim 2 including logic for normalizing the result of the combination of the local slant flags, prior to application of the significance test, by dividing said result by the number of pixel color changes in the row.

6. An image processing apparatus of claim 2 wherein the local slant test comprises a comparison of an n×n pixel neighborhood centered on the pixel with a plurality of predetermined pixel patterns, at least one of which patterns comprises features characteristic of character slant to the left and at least one of which patterns comprises features characteristic of character slant to the right.

7. An image processing apparatus of claim 2 wherein the row slant flags take a value X when in the row there is significantly greater number of pixels with local slant indicators showing a local character slant to the right, and a value −X when there is a significantly greater number of pixels in the row with local slant indicators showing a character slant to the left and zero otherwise and wherein the logic for combining the row slant flags comprises logic for summing the row slant flags.

8. An image processing apparatus of claim 2 wherein the generation of the local slant flags, the combination of the local slant flags and the generation and combination of the row slant flags take place in the same scan of the image.

9. An optical character recognition system for recognizing an image of a word, the OCR system comprising image processing apparatus of claim 2 with a scanner connected with the image processing apparatus, the scanner providing the image processing apparatus with the word image in electronic form.

10. A method of operating image processing apparatus to correct the character slant in a word image in electronic form, which image comprises a plurality of pixels arranged in rows and columns, each having a corresponding image value, the method comprising the steps of:

scanning the electronic form of the image and applying a local slant test to the image values of the pixel and the neighboring pixels thereto, the local slant test detecting color change patterns in the neighborhood of the pixel to determine whether in the image at the pixel there is local character slant to the left, to the right or neither and storing a local slant flag accordingly;

reading from storage and combining the local slant flags for the pixels in each row, and storing the result (S) of the combination;

applying a significance test to the result (S) of the combination to generate, and store, a row-slant flag (I) for the row, which row-slant flag is indicative of whether in the row there is significantly greater number of pixels with local slant flags showing a local character slant to the right, a significantly greater number of pixels in the row with local slant flag showing a character slant to the left or neither;

reading from storage and combining the row-slant flags (I) for all of the rows to determine a shear parameter (G);

applying a shear transformation to the electronic form of the corrected image in accordance with the determined shear parameter (G); and outputting correction signals to write said corrected image in storage.

11. A method of claim 10 wherein the step of applying the shear transformation comprises the steps of:

determining a monotonic sequence of integers between 0 and the shear parameter and insuring there is uniform spacing where neighboring elements of the sequence are not equally spaced, the length of said sequence being equal to the number of rows in said image, and said integers of the sequence being univocally associated to a row; and shifting, for each row, each pixel image value of a number of positions equal to the integer of said sequence associated to the row.

* * * * *